United States Patent [19]
Yoshida

[11] Patent Number: 4,751,478
[45] Date of Patent: Jun. 14, 1988

[54] MULTILEVEL MODULATOR CAPABLE OF PRODUCING A COMPOSITE MODULATED SIGNAL COMPRISING A QUADRATURE AMPLITUDE MODULATED COMPONENT AND A PHASE MODULATED COMPONENT

[75] Inventor: Yasuharu Yoshida, Tokyo, Japan

[73] Assignee: NEC Corporation, Tokyo, Japan

[21] Appl. No.: 12,405

[22] Filed: Feb. 9, 1987

[30] Foreign Application Priority Data

Feb. 8, 1986 [JP] Japan .................................. 61-24950
Oct. 14, 1987 [JP] Japan .................................. 62-5136

[51] Int. Cl.⁴ .......................... H03C 3/00; H03K 7/10
[52] U.S. Cl. .................................. 332/9 R; 332/16 R; 332/17; 329/50; 329/109; 329/110; 329/135; 375/39
[58] Field of Search ............ 332/9 R, 16 R, 17, 23 R, 332/23 A; 329/50, 109, 110, 122, 124, 135; 375/39, 80

[56] References Cited

U.S. PATENT DOCUMENTS 4,498,050 2/1985 Yoshida .............................. 329/110
4,574,246 3/1986 Yoshida ............................ 329/50 X
4,675,619 6/1987 Uchibori et al. .................. 332/31 R

*Primary Examiner*—Gene Wan
*Assistant Examiner*—David Mis
*Attorney, Agent, or Firm*—Sughrue, Mion, Zinn, Macpeak & Seas

[57] ABSTRACT

Responsive to a first and a second main data signal and a subdata signal, a multilevel modulator produces a composite modulated signal which comprises a quadrature amplitude modulated component modulated by the first and the second main data signals and represented by a radius on a phase plane and a phase modulated component modulated by the subdata signal are represented by a clockwise and a counterclockwise shift on the phase plane. A multilevel demodulator carries out an inverse operation to reproduce the composite modulated signal into first and second reproduced main data signal and a reproduced subdata signal.

18 Claims, 10 Drawing Sheets

| GROUPS | OUTPUT SIGNAL POINTS |
|---|---|
| ① G1 ($\frac{3}{2}\pi$) | A12, A23, A32, A43, B12, B23, B32, B43, |
| ② G2 ($\frac{\pi}{2}$) | A13, A22, A33, A42, B13, B22, B33, B42, |
| ③ G4 (0) | A11  A21  A31  A41  B11  B21  B31  B41 |
| ④ G5 ($\pi$) | A14  A24  A34  A44  B14  B24  B34  B44 |

| OUTPUT SIGNAL POINT | FP2 | FQ2 |
|---|---|---|
| Aij | $-\tan\alpha$ | $\tan\alpha$ |
| Bij | $\tan\alpha$ | $-\tan\alpha$ |

MULTILEVEL MODULATOR CAPABLE OF PRODUCING A COMPOSITE MODULATED SIGNAL COMPRISING A QUADRATURE AMPLITUDE MODULATED COMPONENT AND A PHASE MODULATED COMPONENT

BACKGROUND OF THE INVENTION

This invention relates to a multilevel modulator capable of producing a composite modulated signal in response to a main data signal and a subdata signal and to a multilevel demodulator for use as a counterpart of the multilevel modulator.

A multilevel modulating system of the type described is exemplified in U.S. Pat. No. 4,498,050 issued Feb. 5, 1985, to Yasuharu Yoshida, the instant applicant, and assigned to NEC Corporation. This system is a composite PSK-PSK modulating system which comprises a $2^k$-phase PSK modulated component carrying the main data signal and a 2-phase PSK modulated component carrying the subdata signal where k represents a positive integer. In the system, the main data signal has a first bit rate $f_1$ which is not less than a second bit rate $f_2$ of the subdata signal. As a result, the subdata signal can be effectively transmitted without adversely affecting a bit error rate of the main data signal.

In the meanwhile, a multilevel quadrature amplitude modulating system has recently become the center of a digital transmission system. In the multilevel quadrature amplitude modulating system, a pair of quadrature-phase carrier signals are amplitude modulated by first and second input signals into a multilevel quadrature amplitude modulated signal. When each of the first and the second input signals is an n-bit binary signal where n is a positive integer which is not less than two, the multilevel quadrature amplitude modulated signal has $2^{2n}$ output signal points on a phase plane which has an origin and real and imaginary axes orthogonally crossing at the origin. Such the multilevel quadrature amplitude modulator is exemplified in U.S. patent application Ser. No. 779,217 filed Sept. 23, 1985, by Junichi Uchibori et al, for assignment to NEC Corporation.

The multilevel quadrature amplitude modulator can effectively utilize a carrier level. Therefore, a large-capacity digital radio communication network ordinarily comprises the multilevel quadrature amplitude modulator.

By the way, the conventional composite modulating system is restricted to the PSK modulation. Namely, the conventional composite modulating system can not be applied to the multilevel quadrature amplitude modulating system.

SUMMARY OF THE INVENTION

It is therefore an object of this invention to provide a multilevel modulator capable of producing a composite modulated signal comprising a quadrature amplitude modulated component and a phase modulated component in response to a main data signal and a subdata signal each of which has different bit rates and which are supplied to the modulator as input signals.

It is another object of this invention to provide a multilevel demodulator which is for use as a counterpart of the multilevel modulator of the type described above.

A multilevel modulator to which this invention is applicable is for modulating first and second main data signals and a subdata signal into a composite modulated signal. Each of the first and the second main data signals is represented by first through n-th bits where n is a positive integer which is not less than two. The subdata signal is represented by one of first and second binary values at a time. The multilevel modulator comprises modulating means responsive to the first and the second main data signals and the subdata signal for modulating the first and the second main data signals and the subdata signal into the composite modulated signal comprising a quadrature amplitude modulated component and a phase modulated component. The quadrature amplitude modulated component is modulated by the first and the second main data signals and has $2^{2n}$ output signal points on a phase plane. The phase modulated component is modulated by the subdata signal.

A multilevel demodulator to which this invention is applicable is for demodulating a composite modulated signal comprising a multilevel quadrature amplitude modulated component modulated by first and second main data signals and a phase modulated component modulated by a subdata signal. Each of the first and the second main data signals is represented by first through n-th bits and has a first bit rate $f_1$. The subdata signal is represented by one of first and second binary values at a time and has a second bit rate $f_2$ which is not greater than the first bit rate divided by a predetermined natural number m. The phase modulated component has a phase difference of $2\alpha$ radian when the subdata signal is represented by a predetermined one of the first and the second binary values where $\alpha$ is not greater than $\pi/2^{2n}$. The multilevel demodulator comprises detecting means for phase detecting said composite modulated signal to produce first and second phase detection signals. According to this invention, the multilevel demodulator further comprises reproducing means coupled to the detecting means for reproducing a reproduced subdata signal and first and second reproduced main data signals in response to the first and the second phase detection signals.

In the manner which will later be illustrated, the amplitude modulated component is represented on a phase plane by a radius from an origin. The phase modulated component is represented by a clockwise or a counterclockwise shift.

DESCRIPTION OF THE PREFERRED EMBODIMENTS

Figure 1:
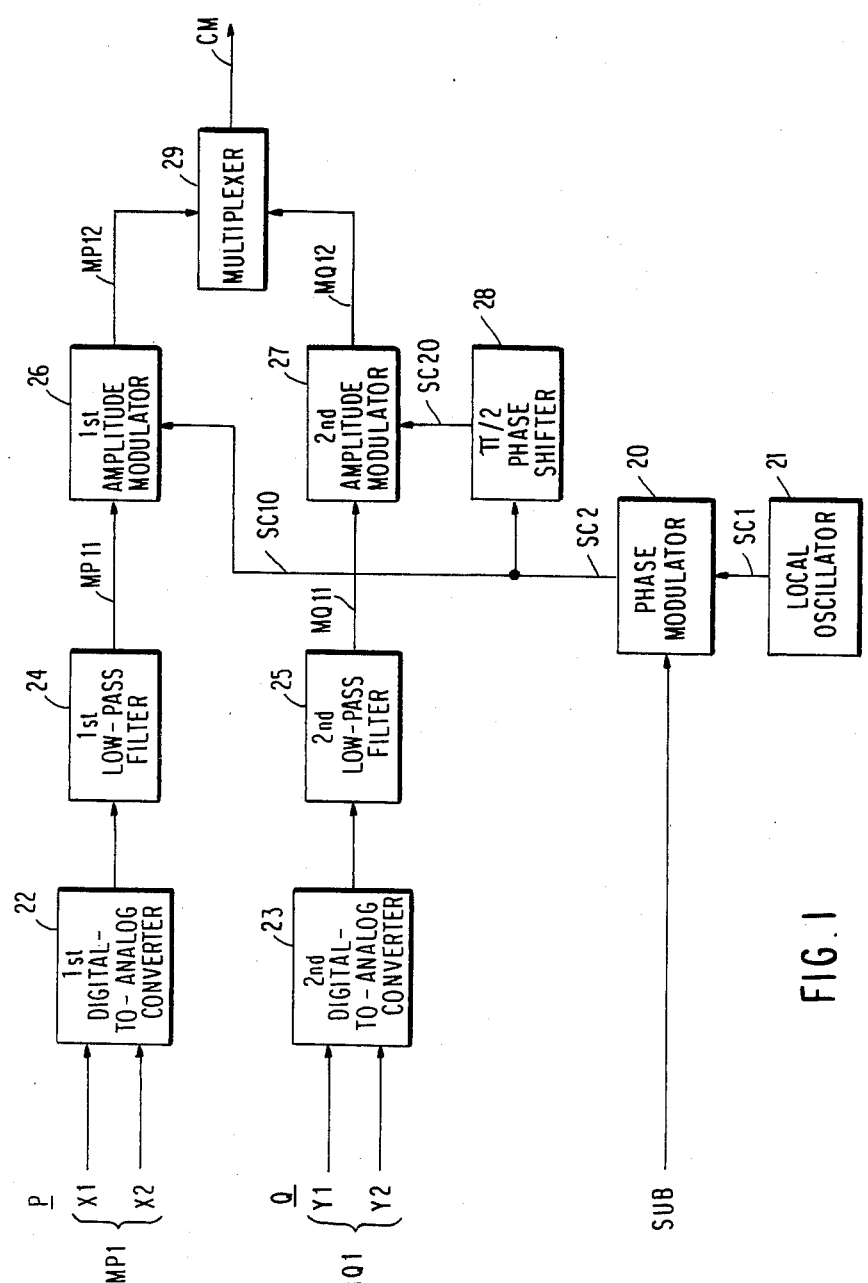
FIG. 1 is a block diagram of a multilevel modulator according to a first embodiment of this invention.

Referring to FIG. 1, a multilevel modulator according to a first embodiment of this invention is similar to a conventional four-by-four quadrature amplitude modulator except for a phase modulator 20. The multilevel modulator is for use in modulating first and second main data signals MP1 and MQ1 and a subdata signal SUB into a composite modulated signal CM. Each of the first and the second main data signals MP1 and MQ1 is represented by n bits where n represents a positive integer which is not less than two. Ordinarily, the n bits are processed in bit parallel. It will be assumed merely for brevity of description that the positive integer is equal to two.

It will be assumed that the first main data signal MP1 is of a channel P and is represented by first and second bits X1 and X2. The second main data signal MQ1 is of another channel Q and is represented by first and second bits Y1 and Y2. Each of the first and the second main data signals MP1 and MQ1 is therefore capable of representing four levels. Each of the first and the second main data signals MP1 and MQ1 has a first bit rate $f_1$. The subdata signal SUB is represented by a single bit, namely, one of first and second binary values which may be binary values "1" and "0". The subdata signal SUB has a second bit rate $f_2$ which is equal to $f_1/m$ where m is a positive integer which is not smaller than two.

The phase modulator 20 is supplied with a carrier oscillation signal SC1 from a local oscillator 21 and is supplied with the subdata signal SUB. The phase modulator 20 is for phase modulating the carrier oscillation signal SC1 by the subdata signal SUB and produces a phase modulated signal SC2. For example, the phase modulated signal SC2 has a first predetermined phase difference relative to the carrier oscillation signal SC1 when the subdata signal SUB has the binary value "0". When the subdata signal SUB has the binary value "1", the phase modulated signal SC2 has a second predetermined phase difference relative to the carrier oscillation signal SC1. The first and the second predetermined phase differences should have a common absolute value $\alpha$ which should not be greater than $\pi/2^{2n}$ radian. In the example being illustrated, 0.19 radian is selected as the common absolute value $\alpha$.

The multilevel modulator comprises a first digital-to-analog converter 22 supplied with the first main data signal MP1 and a second digital-to-analog converter 23 supplied with the second main data signal MQ1. The first digital-to-analog converter 22 converts the first main data signal MP1 to a first analog signal. The second digital-to-analog converter 23 converts the second main data signal MQ1 to a second analog signal. Each of the first and the second analog signals has an amplitude level determined by a pertinent one of the first and the second main data signals MP1 and MQ1. The first and the second analog signals are delivered through first and second low-pass filters 24 and 25 to first and second amplitude modulators 26 and 27 as first and second modulating signals MP11 and MQ11, respectively.

The phase modulated signal SC2 is delivered to the first amplitude modulator 26 as a first carrier signal SC10 and supplied through a $\pi/2$-phase shifter 28 to the second amplitude modulator 27 as a second carrier signal SC20. The first carrier signal SC10 has a quadrature phase difference relative to the second carrier signal SC20. The first and the second amplitude modulators 26 and 27 amplitude modulate the first and the second carrier signals SC10 and SC20 by the first and the second modulating signals MP11 and MQ11, respectively.

The first and the second amplitude modulators 26 and 27 produce first and second modulated signals MP12 and MQ12 and deliver the first and the second modulated signals MP12 and MQ12 to a multiplexer 29. The multiplexer 29 multiplexes the first and the second modulated signals MP12 and MQ12 into the composite modulated signal CM. It is seen that the composite modulated signal CM comprises a multilevel quadrature amplitude modulated component and the above-described phase modulated component. The multilevel quadrature amplitude modulated component is modulated by the first and the second main data signals MP1 and MQ1. The composite modulated signal CM has sixteen output signal points on a phase plane as will later be described. The composite modulated signal CM is transmitted to a multilevel demodulator through a transmission medium.

Figures 2, 8:
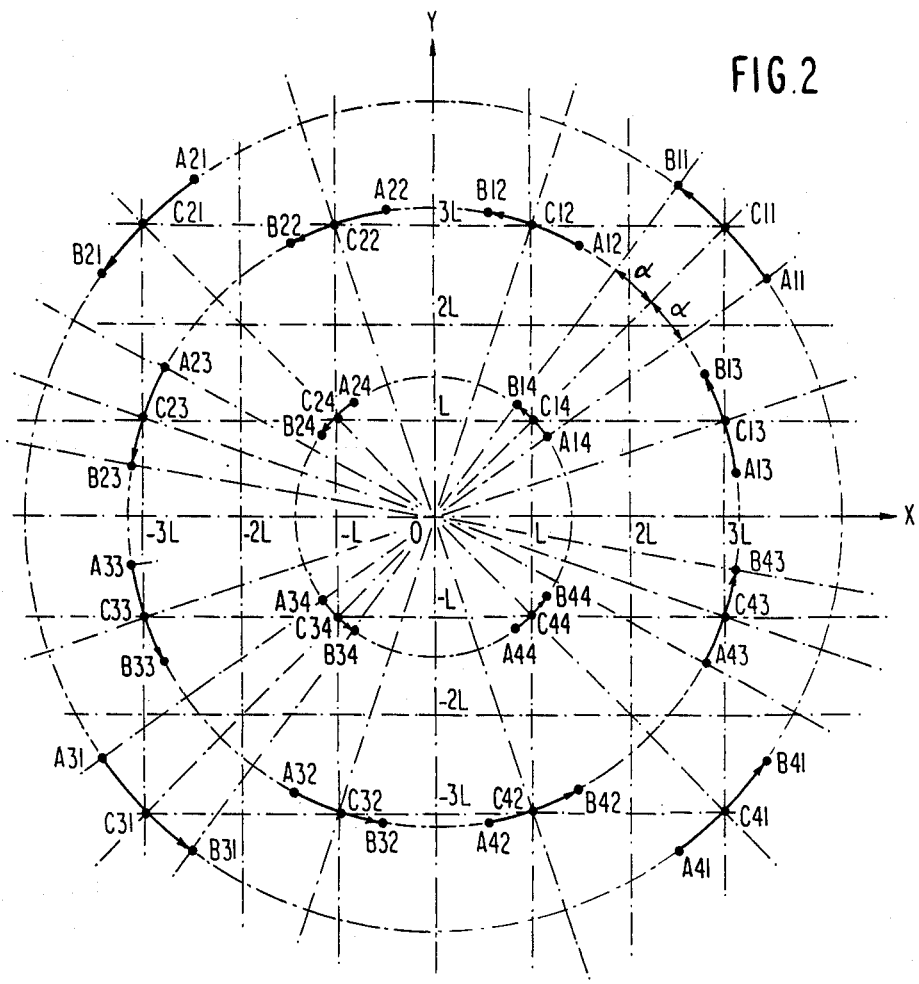
FIG. 2 shows an output signal point arrangement of a composite modulated signal produced by the multilevel modulator illustrated in FIG. 1.
FIG. 8 is a view for use in describing operation of the subdata reproducing circuit illustrated in FIG. 7.

Referring to FIG. 2, the phase plane is defined by an origin 0 and real and imaginary axes X and Y orthogonally crossing at the origin 0. The real and the imaginary axes X and Y represent the first and the second modulated signals MP12 and MQ12 of the respective channels P and Q. The sixteen output signal points are depicted at Aij or Bij, where i and j are positive integers which are not greater than four. The output signal points Aij are derived when the subdata signal SUB has the binary value "0" and consequently when the phase modulated signal SC2 has the first predetermined phase difference relative to the carrier oscillator signal SC1. Each pair of the output signal points Aij and Bij has a phase difference which is equal to twice the common absolute value $\alpha$. Additional signal points Cij are depicted at midpoints of the output signal points Aij and Bij along concentric circles. The additional signal points Cij have amplitude levels $\pm L$ and $\pm 3L$. These amplitude levels $\pm L$ and $\pm 3L$ are used as reference levels on reproducing the first and the second main data signals MP1 and MQ1 in the multilevel demodulator as will be described later.

Figure 3:
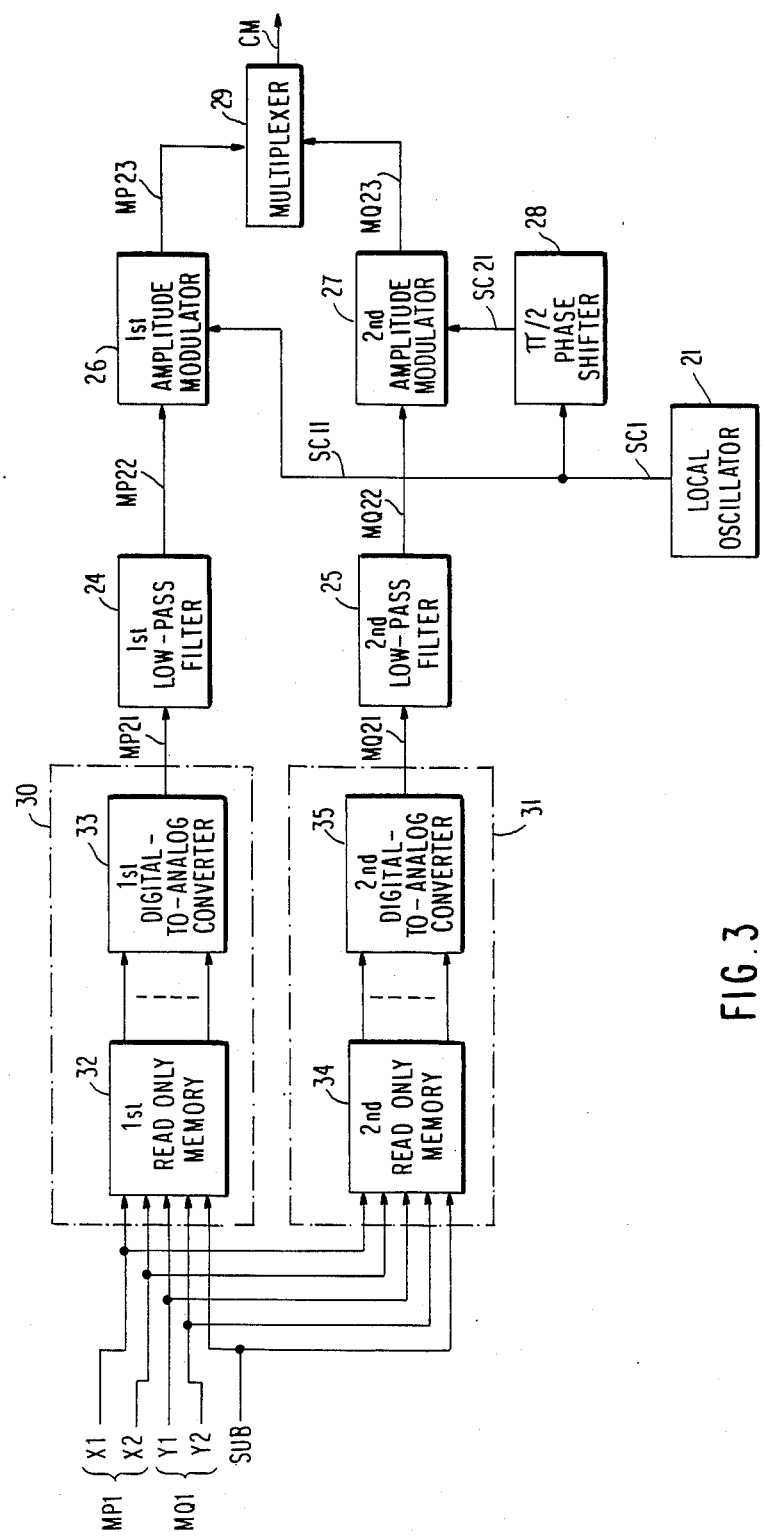
FIG. 3 is a block diagram of a multilevel modulator according to a second embodiment of this invention.

Referring to FIG. 3, a multilevel modulator according to a second embodiment of this invention is similar to that illustrated in FIG. 1. The multilevel modulator, however, does not comprise the phase modulator 20 described in connection with FIG. 1. Instead, the multilevel modulator comprises first and second converting units 30 and 31, each of which is supplied with the first and the second main data signals MP1 and MQ1 and the subdata signal SUB. The first converting unit 30 comprises a first read-only memory 32 and a first digital-to-analog converter 33. Likewise, the second converting unit 31 comprises a second read-only memory 34 and a second first digital-to-analog converter 35. Each of the first and the second converting units 30 and 31 converts the first and the second main data signals MP1 and MQ1 and the subdata signal SUB to first and second analog signals MP21 and MQ21. Each of the first and the second analog signals MP21 and MQ21 has an amplitude level which is determined by the first and the second main data signals MP1 and MQ1 and is modified by the subdata signal SUB. In other words, each of the first and the second analog signals MP21 and MQ21 can be regarded as a phase modulated signal in which each of the first and the second main data signals MP1 and MQ1 is phase modulated by the subdata signal SUB. The first and the second analog signals MP21 and MQ21 are delivered through the first and the second low-pass filters 24 and 25 to the first and the second amplitude modulators 26 and 27 as first and second modulating signals MP22 and MQ22, respectively.

The carrier oscillation signal SC1 is supplied directly to the first amplitude modulator 26 as a first carrier signal SC11 and, through the $\pi/2$-phase shifter 28, to the second amplitude modulator 27 as a second carrier signal SC21. The first and the second amplitude modulators 26 and 27 amplitude modulate the first and the second carrier signals SC11 and SC21 by the first and the second modulating signals MP22 and MQ22 into first and second modulated signals MP23 and MQ23, respectively. The first and the second modulated signals MP23 and MQ23 have amplitude levels which are equal to orthogonal projections of the output signal points Aij or Bij (FIG. 2) to the real and the imaginary axes X and Y.

In order to derive the composite modulated signal CM having a high accuracy, it is desirable that each of the first and the second read-only memories 32 and 34 has an increased number of output bits. However, each of the first and the second read-only memories 32 and 34 ma have eight bits for the four-by-four quadrature amplitude modulator.

In FIG. 3, the multilevel modulator is compact as compared with the multilevel modulator illustrated with reference to FIG. 1. Furthermore, it is unnecessary with the multilevel modulator of FIG. 3 to keep bit synchronism between each of the first and the second main data signals MP1 and MQ1 and the subdata signal SUB and is possible to use a limited common bandwidth for the first and the second main data signals MP1 and MQ1 and the subdata signal SUB.

Figure 4:
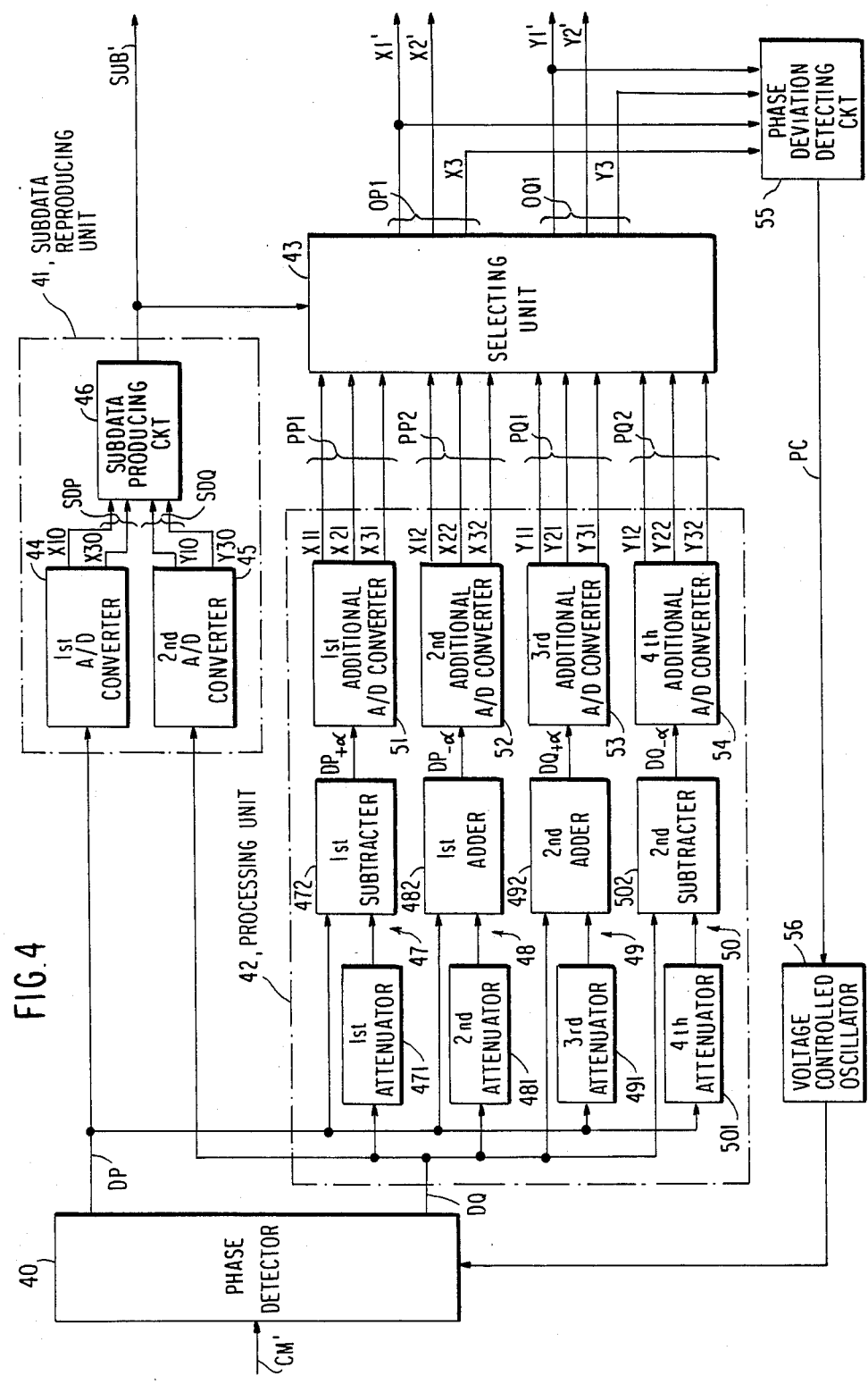
FIG. 4 is a block diagram of a multilevel demodulator for use as a counterpart of the multilevel modulator illustrated in FIG. 1.
Figure 5:
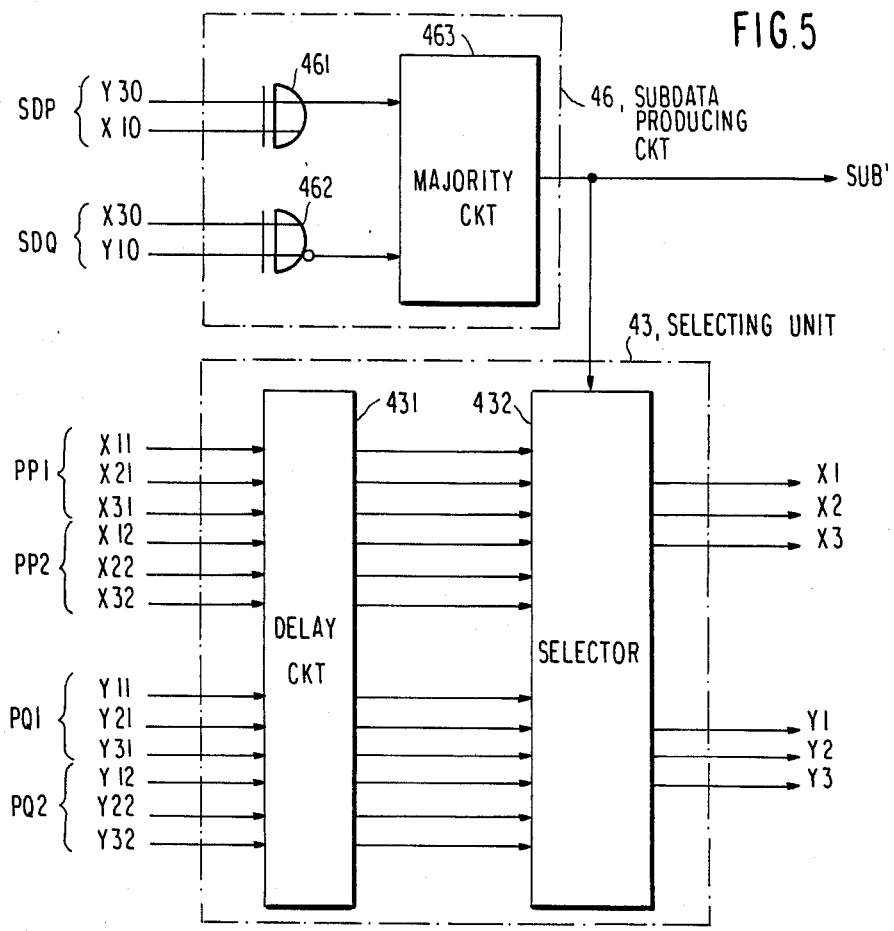
FIG. 5 is a block diagram of a subdata producing circuit and a selecting unit operable as a part of the multilevel demodulator illustrated in FIG. 4.

Referring to FIGS. 4 and 5, a multilevel demodulator is for use as a counterpart of whichever of the multilevel modulators illustrated with reference to FIGS. 1 and 3 and is for demodulating the composite modulated signal produced by the multilevel modulator. The multilevel demodulator comprises a phase detector 40, a subdata reproducing unit 41, a processing unit 42, and a selecting unit 43.

The phase detector 40 is supplied with the composite modulated signal indicated at CM'. The phase detector 40 carries out phase detection of the composite modulated signal CM' and produces a first phase detection signal as a first analog signal DP of the channel P and a second phase detection signal as a second analog signal DQ of the other channel Q. Each of the first and the second analog signals DP and DQ has amplitude levels which are equal to orthogonal projections projected to the real and the imaginary axes X and Y on the phase plane as described in relation to FIG. 2.

The subdata reproducing unit 42 is for reproducing a reproduced subdata signal SUB' and comprises first and second analog-to-digital converters 44 and 45 and subdata producing circuit 46. Each of the first and the second analog-to-digital converters 44 and 45 has four reference levels depicted in FIG. 2 at $\pm L$ and $\pm 3L$. The first and the second analog-to-digital converters 44 and 45 are for discriminating the amplitude levels of the first and the second analog signals DP and DQ. The first analog-to-digital converter 44 produces a first digital signal as a first subdata discrimination signal SDP represented by first and second bits X10 and X30. The second analog-to-digital converter 45 produces a second digital signal as a second subdata discrimination signal SDQ represented by first and second bits Y10 and Y30. The first bits X10 and Y10 of the first and the second subdata discrimination signals SDP and SDQ are for discriminating one of quadrants of the phase plane.

The subdata producing circuit 46 is supplied with the first and the second subdata discrimination signals SDP and SDQ. As shown in FIG. 5, the subdata producing circuit 46 comprises Exclusive OR and NOR circuits 461 and 462 and a majority circuit 463. Responsive to the first bit X10 of the first subdata discrimination signal SDP and the second bit Y30 of the second subdata discrimination signal SDQ, the Exclusive OR circuit 461 produces a first logical output signal. Supplied with the second bit X30 of the first subdata discrimination signal SDQ and the first bit Y10 of the second subdata discrimination signal SDP, the Exclusive NOR circuit 462 produces a second logical output signal.

When the first and the second analog signals DP and DQ have the amplitude levels of the output signal points Aij (FIG. 2), both of the first and the second logical output signals have binary value "1" whichever quadrant the output signal point Aij may be. On the other hand, when the first and the second analog signals DP and DQ have the amplitude levels of the output signal points Bij, both of the first and the second logical output signals have binary value "0". It will readily be understood that the binary values of the first and the second logical output signals correspond to those of the subdata signal.

In the manner described before, the first and the second logical output signals have the first bit rate $f_1$. The subdata signal SUB has the second bit rate $f_2$ which is equal to $f_1/m$. In the first and the second logical output signals, same codes, m in number, may last in succession while one of the binary bits continues in the subdata signal SUB. This is because the first and the second main data signals are modulated by subdata signal SUB. But, a discrimination error may occur in outputs of the first and the second analog-to-digital converters 44 and 45. This is because the first and the second analog signals DP and DQ has a small level difference relative to the reference levels of the first and the second analog-to-digital converters 44 and 45. This means that the code error or errors may appear in the succession of m bits of the first and the second logical output signals. As a result, the reproduced subdata signal SUB' has a reduced code error rate.

In order to get rid of an influence of the code error of the first and the second logical output signals, each of the first and the second logical output signals is delivered in bit series to the majority circuit 463. For each of the first and the second logical output signals, the majority circuit 463 carries out a majority decision known in the art with regard to the succession of m bits which may include the code error or errors. The majority circuit 463 produces an output signal in which a result of the majority decision lasts m bits. The output signal of the majority circuit 463 is the reproduced subdata signal SUB'. Thus, the code error rate of the reproduced subdata signal SUB' is improved. The code error rate depends on the positive integer m and the phase difference $\alpha$. It is therefore desirable that the positive integer m and the phase difference $\alpha$ should be a large number and a large difference. The phase difference $\alpha$ is, however, restricted to $\pi/2^{2n}$ radian in the manner described hereinbefore.

Referring again to FIG. 4, the processing unit 42 will be described more in detail. The processing unit 42 comprises first through fourth phase shifters 47 to 50 and first through fourth additional analog-to-digital converters 51 to 54. The first phase shifter 47 comprises a first attenuator 471 and a first subtracter 472 and is for shifting the phase of the first analog signal DP with the second analog signal DQ used as will be described later. Likewise, the second shifter 48 comprises a second attenuator 481 and a first adder 482 and is for shifting the phase of the first analog signal DP. The third phase shifter 49 comprises a third attenuator 491 and a second adder 492 and is for shifting the phase of the second analog signal DQ with the first analog signal DP used as will be described later. Similarly, the fourth phase shifter 50 comprises a fourth attenuator 501 and a second subtracter 502 and is for shifting the phase of the second analog signal DQ.

In the first phase shifter 47, the first attenuator 471 attenuates the amplitude level of the second analog signal DQ by an attenuation factor which will presently be described. The first attenuator 471 thereby delivers an attenuated signal to the first subtracter 472. The subtracter 472 subtracts the amplitude level of the attenuated signal from the amplitude level of the first analog signal DP and delivers an output signal, namely, a first phase shifted signal $DP_{+\alpha}$, to the first additional analog-to-digital converter 51.

In the example being illustrated, the attenuation factor of the attenuator 471 is equal to tan $\alpha$. The first phase shifted signal $DP_{+\alpha}$ is therefore given by:

$$A_P \cos\theta - A_Q \sin\theta \cdot \tan\alpha = K \cdot \cos(\theta + \alpha),$$

where $A_P$ and $A_Q$ represent amplitude levels of the first and the second analog signals DP and DQ, $\theta$ represents the phase of the first and the second analog signals DP and DQ, and K represents a constant. Thus, the first phase shifted signal $DP_{+\alpha}$ has a leading phase of $\alpha$ radian relative to the first analog signal DP.

Likewise, the second phase shifter 48 supplies the second additional analog-to-digital converter 52 with a second phase shifted signal $DP_{-\alpha}$ having a lagging phase of $\alpha$ radian relative to the first analog signal DP. The third phase shifter 49 supplies the third additional analog-to-digital converter 53 with a third phase shifted signal $DQ_{+\alpha}$ having the leading phase of $\alpha$ radian relative to the second analog signal DQ. The fourth phase shifter 50 supplies the fourth additional analog-to-digital converter 54 with a fourth phase shifted signal $DQ_{-\alpha}$ having the lagging phase of $\alpha$ radian relative to the second analog signal DQ.

When the first and the second analog signals DP and DQ correspond to the output signal points Aij (FIG. 2), a combination of the first and the third phase shifted signal $DP_{+\alpha}$ and $DQ_{+\alpha}$ represents each of the additional signal points Cij. The first and the third phase shifted signals $DP_{+\alpha}$ and $DQ_{+\alpha}$ therefore have the four amplitude levels $\pm L$ and $\pm 3L$. When the first and the second analog signals DP and DQ correspond to the output signal points Bij (FIG. 2), the second and the fourth phase shifted signals $DP_{-\alpha}$ and $DQ_{-\alpha}$ each of which has the lagging phase of $\alpha$ radian have the four amplitude levels of $\pm L$ and $\pm 3L$.

The first through the fourth additional analog-to-digital converters 51 to 54 have first through seventh reference levels of 0, $\pm L$, $\pm 2L$, and $\pm 3L$ and carry out a multilevel discrimination on the first through the fourth phase shifted signals $DP_{+\alpha}$, $DP_{-\alpha}$, $DQ_{+\alpha}$, and $DQ_{-\alpha}$. The first additional analog-to-digital converter 51 produces a first main data discrimination signal as a first processed digital signal PP1 represented by first through third bits X11 to X31. The first processed digital signal PP1 corresponds to the output signal points Aij. Likewise, the second additional analog-to-digital converter 52 produces a second processed digital signal PP2. The second processed digital signal PP2 corresponds to the output signal points Bij and is represented by first through third bits X12 to X32. The third additional analog-to-digital converter 53 produces a third processed digital signal PQ1. The third processed digital signal PQ1 corresponds to the output signal points Aij and is represented by first through third bits Y11 to Y31. The fourth additional analog-to-digital converter 54 produces a fourth converted digital signal PQ2 which corresponds to the output signal points Bij and which is represented by first through third bits Y12 to Y32.

Referring again to FIG. 5, the selecting unit 43 comprises a delay circuit 431 and a selector 432 and is supplied with the first through the fourth processed digital signals PP1, PP2, PQ1, and PQ2 and the reproduced subdata signal SUB'. The delay circuit 431 is for giving a delay to the first through the fourth processed digital signals PP1, PP2, PQ1, and PQ2 so as to keep bit synchronism between each of the first through the fourth processed digital signals PP1, PP2, PQ1, and PQ2 and the reproduced subdata signal SUB'. This is because the reproduced subdata signal SUB' has a time lag as a result of the majority decision described before. The time lag is equal to m bits of the first and the second subdata discrimination signals SDP and SDQ. Each of the first through the fourth processed digital signals PP1, PP2, PQ1, and PQ2 has a bit rate which is equal to that of the first and the second subdata discrimination signals SDP and SDQ. The delay circuit 431 has therefore a delay of m bits which are given by each of the first through the fourth processed digital signals PP1, PP2, PQ1, and PQ2.

Reference will again be had to FIG. 4. When the reproduced subdata signal SUB' has the binary value "1", namely, when the first and the second analog signals DP and DQ correspond to the output signal points Aij, the selecting unit 43 selects the first and the third processed digital signals PP1 and PQ1 and produces the first and the third processed digital signals PP1 an PQ1 as first and second output signals OP1 and OQ1. When the reproduced subdata signal SUB' has the binary value "0", namely, when the first and the second analog signals DP and DQ correspond to the output signal points Bij, the selecting unit 43 selects the second and the fourth processed digital signals PP2 and PQ2 and produces the second and the fourth processed digital signals PP2 and PQ2 as the first and the second output signals OP1 and OQ1.

The first output signal OP1 is represented by first through third bits X1', X2', and X3. The second output signals OQ1 is represented by first through third bits Y1', Y2', and Y3. A combination of the first and the second bits X1' and X2' of the first output signal OP1 is a reproduced signal of the first main data signal MP1. Another combination of the first and the second bits Y1' and Y2' of the second output signal OQ1 is a reproduced signal of the second main data signal MQ1. Third bits X3 and Y3 of the first and the second output signals OP1 and OQ1 are phase deviation signals of the first and the second analog signals DP and DQ, respectively.

The first and the third bits of the first and the second output signals OP1 and OQ1 are delivered to a phase deviation detecting circuit 55. The phase deviation detecting circuit 37 produces a phase control signal PC in response to the first bits X1' and Y1' and the third bits X3 and Y3 of the first and the secon output signals OP1 and OQ1. The phase control signal PC is delivered to a voltage controlled oscillator 56. The voltage controlled oscillator 56 produces a local oscillation signal which is phase-locked to the phase control signal PC. Such a phase-locked loop operation is described in Japanese Published Unexamined Patent Application No. 131151/82 by the present applicant an will not be described any longer.

Figure 6:
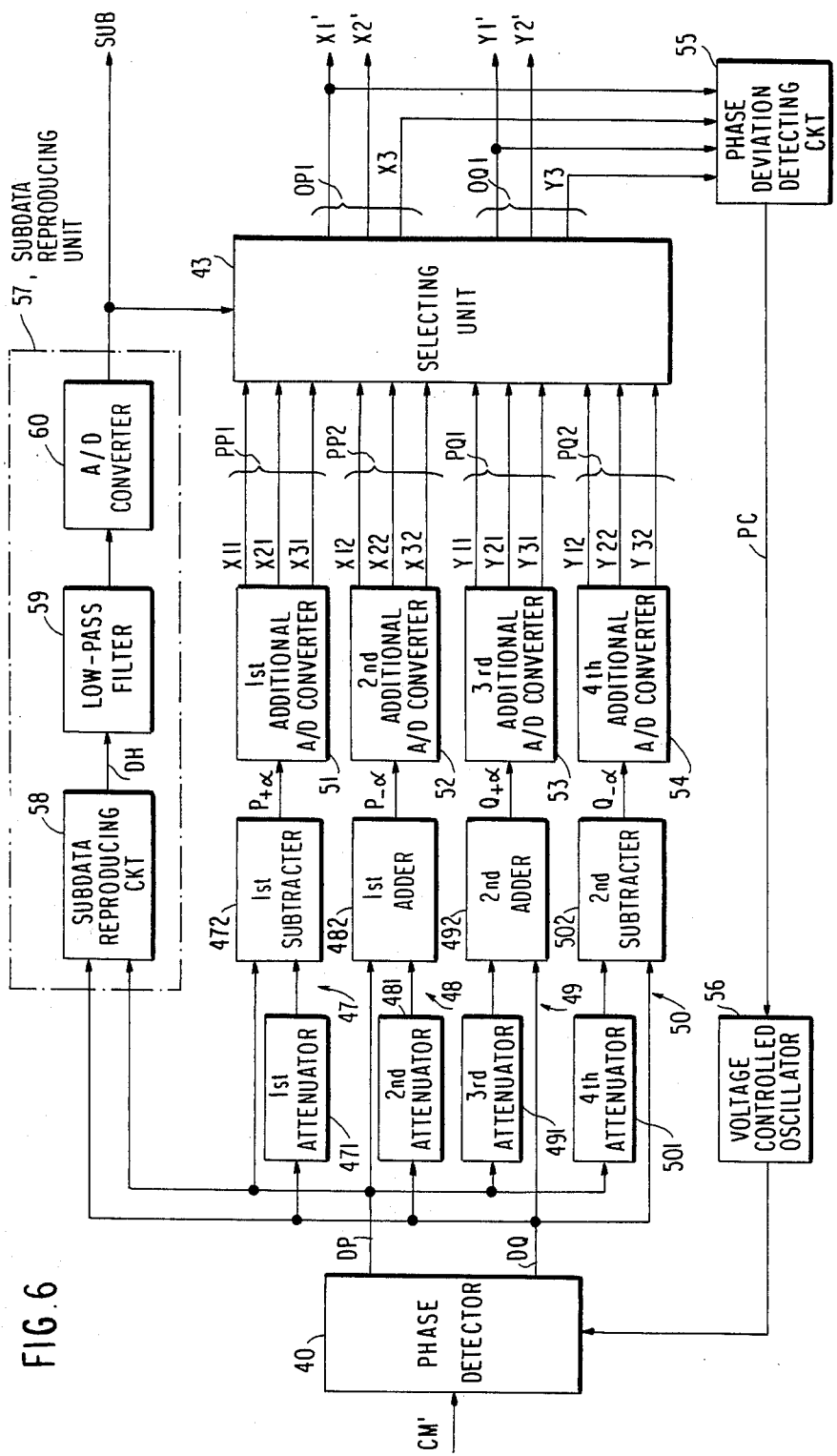
FIG. 6 is a block diagram of a multilevel demodulator according to another aspect of this invention.

Referring to FIG. 6, a multilevel demodulator according to another aspect of this invention is for use as a counterpart of whichever of the multilevel modulators illustrated with reference to FIGS. 1 and 3. A subdata reproducing unit 57 is used instead of the subdata reproducing circuit 41 described in conjunction with FIG. 4. In other respects, the multilevel demodulator is similar to that illustrated with reference to FIG. 4.

The subdata reproducing unit 57 comprises a subdata reproducing circuit 58, a low-pass filter 59, and an analog-to-digital converter 60. In the manner which will later be described in detail, the subdata reproducing circuit 58 is implemented by analog circuits. Supplied with the first and the second analog signals DP and DQ from the phase detector 40, the subdata reproducing circuit 58 reproduces a reproduced analog subdata signal DH in the form of an analog signal.

Figure 7:
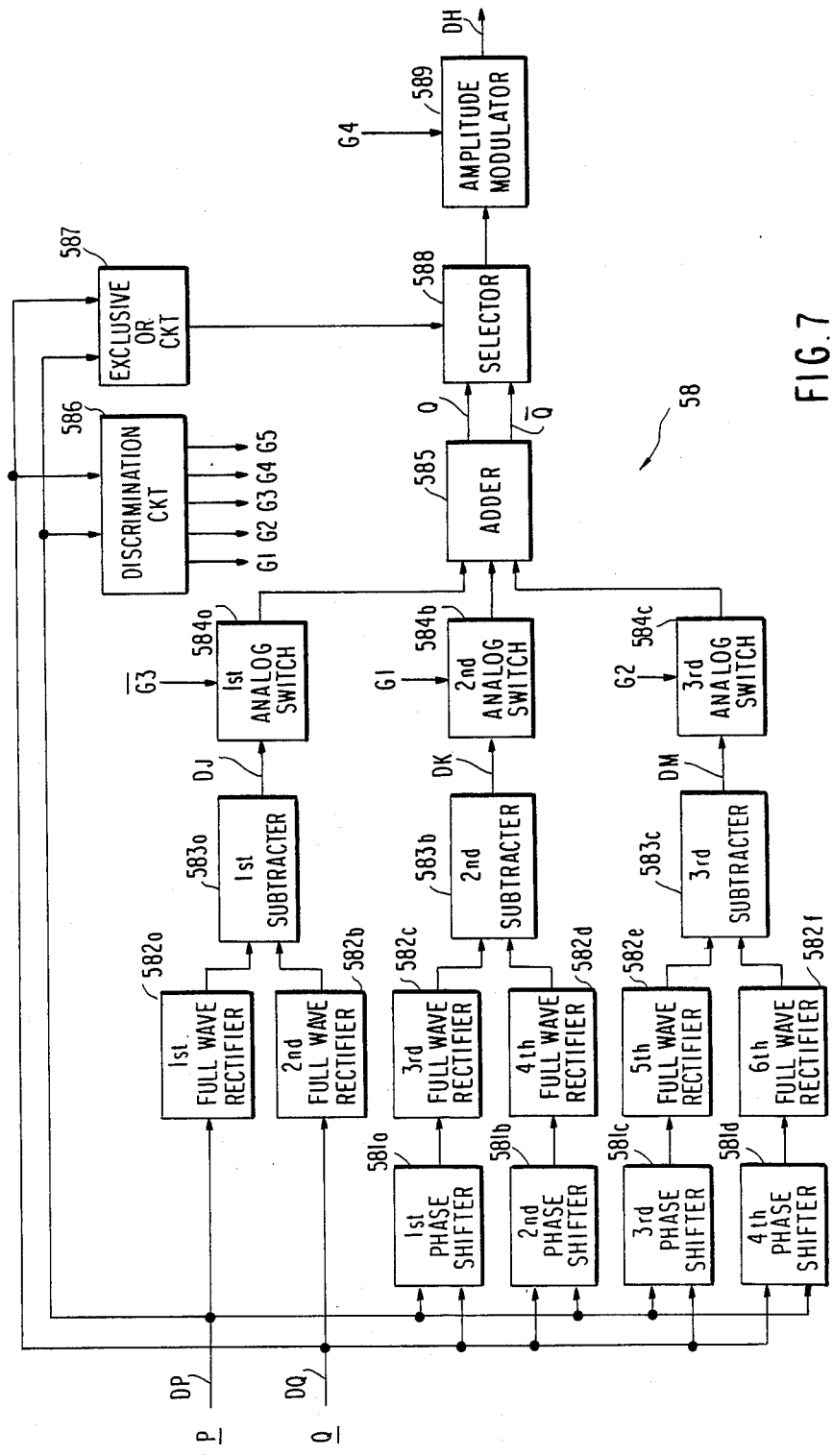
FIG. 7 is a block diagram of a subdata reproducing circuit operable as a part of the multilevel demodulator illustrated in FIG. 6.

Referring to FIG. 7, the subdata reproducing circuit 58 comprises first through fourth phase shifters 581a to 581d, first through sixth full wave rectifiers 582a to 582f, first through third subtracters 583a to 583c, first through third analog switches 584a to 584c, and an adder 585. The subdata reproducing circuit 58 further comprises a discrimination circuit 586, an Exclusive-OR circuit 587, a selector 588, and an amplitude modulator 589. Such a reproducing circuit 58 is described in Japanese Published Examined Patent Application No. 698/83 by the present applicant. Therefore, description will be made with regard to parts which are operable in specific conjunction with this invention.

If the phase detector 40 (FIG. 6) is supplied with the conventional multilevel quadrature amplitude modulated signal, the subdata reproducing circuit 58 serves to produce a phase deviation signal of a reference carrier signal reproduced in the multilevel demodulator. In the example being illustrated, the phase detector 40 is supplied with the composite modulated signal comprising the phase modulated component which has the phase differences of $\pm\alpha$ radian in accordance with the binary values of the subdata signal SUB. Therefore, the subdata reproducing circuit 58 produces the reproduced analog subdata signal DH in place of the phase deviation signal.

Briefly, a combination of the first and the second full wave rectifiers 582a and 582b and the first subtracter 583a serves to produce a first processed analog signal DJ in response to the first and the second analog signals DP and DQ. Responsive to the first and the second analog signals DP and DQ, a combination of the first and the second phase shifters 581a and 581b, the second and the third full wave rectifiers 582c and 582d, and the second subtracter 583b serves to produce a second processed analog signal DK. Responsive to the first and the second analog signals DP and DQ, a combination of the third and the fourth phase shifters 581c and 581d, the fifth and the sixth full wave rectifiers 582e and 582f, and the third subtracter 583c also serves to produce a third processed analog signal DM.

The output signal points Aij and Bij are classified into first through fourth groups shown in FIG. 8. The discrimination circuit 586 is for discriminating positions of the output signal points Aij or Bij and produces first through fifth discrimination signals G1 to G5 as discrimination results. The third discrimination signal G3 is a logical sum signal of the first and the second discrimination signals G1 and G2. The first analog switch 584a allows the first processed analog signal DJ to pass through on reception of a negation signal $\overline{G3}$ of the third discrimination signal G3. The second and the third analog switches 584b and 584c allow the second and the third processed analog signals DK and DM pass through on reception on the first and the second discrimination signals G1 and G2, respectively. With regard to the first quadrant of the phase plane, the first processed analog signal DJ is supplied to the adder 585 when the first and the second analog signals DP and DQ correspond to one of the output signal points A11, A14, B11, and B14. The second processed analog signal DK is supplied to the adder 585 when the first and the second analog signals DP and DQ correspond to the output signal points A12 or B12. The third processed analog signal DM is supplied to the adder 585 when the first and the second analog signals DP and DQ correspond to the output signal points A13 or B13. On the other hand, the amplitude modulator 589 carries out amplitude modulation in response to the fourth discrimination signal G4.

The reproduced analog subdata signal DH has three different levels in accordance with the positions of the output signal points Aij and Bij. This is because the output signal points Aij and Bij are arranged along three concentric circles which have different diameters and a common center at the origin 0 as shown in FIG. 2. For example, the three different levels are defined by A11B11, A12B12, and A14B14 in FIG. 2. Therefore, the reproduced analog subdata signal has an instantaneous level which varies among the three different levels at random.

In order to average the three different levels of the reproduced analog subdata signal DH, the low-pass filter 59 (FIG. 6) is given a bandwidth defined by approximately $f_1/m$. In addition, the low-pass filter 59 suppresses thermal noise of the reproduced analog subdata signal DH and a residual jitter component of the first and the second main data signals MP1 and MQ1.

An output signal of the low-pass filter 59 is converted by the analog-to-digital converter 60 to a digital signal of a single bit. The digital signal is the reproduced subdata signal SUB'.

An average discrimination margin, namely, an average discrimination level for the reproduced subdata signal SUB' is defined by $A\overline{12B12}$ (FIG. 2). On the other hand, the average discrimination level for the first and the second main data signals is defined by 2L. In the example being illustrated, the code error rate of each of the first and the second reproduced main data signals is superior to that of the reproduced subdata signal SUB' by approximately 6 dB. But, when the positive integer m is equal to eight, the code error rate of the reproduced subdata signal SUB' is improved by approximately 9 dB because of the improvement of the thermal noise by the use of the low-pass filter 59 (FIG. 6). Finally, the code error rate of the reproduced subdata signal SUB' can be improved by 3 dB as compared with the reproduced first and the second main data signals.

Figure 9:
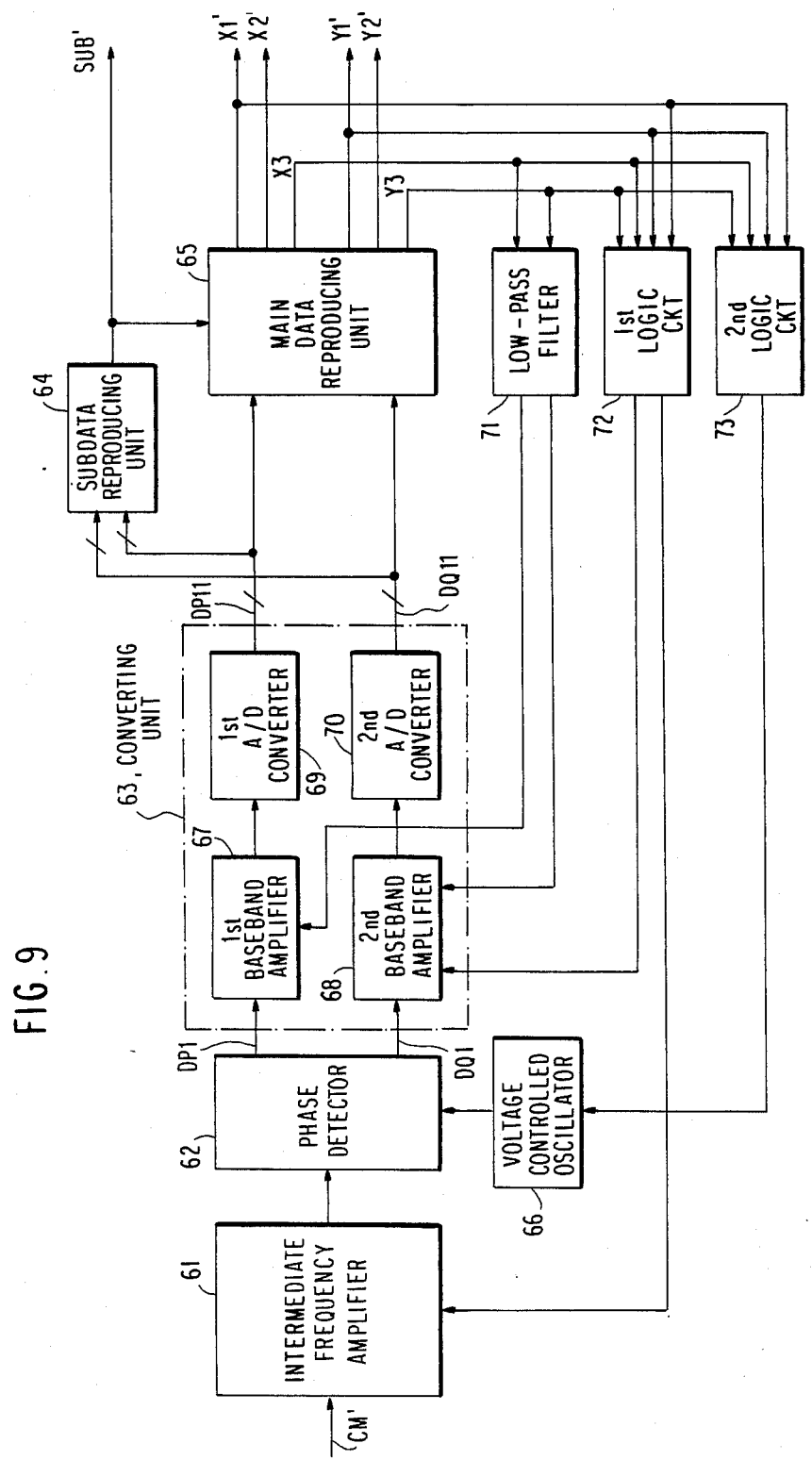
FIG. 9 is a block diagram of a multilevel demodulator according to still another aspect of this invention.

Referring to FIG. 9, a multilevel demodulator according to still another aspect of this invention is for use as a counterpart of whichever of the multilevel modulators illustrated with reference to FIGS. 1 and 3.

The multilevel demodulator comprises an intermediate-frequency amplifier 61, a phase detector 62, a converting unit 63, a subdata reproducing unit 64, and a main data reproducing unit 65. In the manner which will later be described in detail, both of the subdata and the main data reproducing units 64 and 65 are implemented by digital circuit.

Supplied with the composite modulated signal CM', the intermediate-frequency amplifier 61 amplifies the composite modulated signal CM' and delivers an amplified signal to the phase detector 62. The phase detector 62 carries out phase detection of the amplitude signal with reference to a pair of quadrature-phase local carrier signals supplied through a voltage controlled oscillator 66. The phase detector 62 delivers first and second analog signals DP1 of the channel P and DQ1 of the channel Q to the converting unit 63.

The converting unit 63 comprises first and second baseband amplifiers 67 and 68 and first and second analog-to-digital converters 69 and 70. Supplied with the first and the second analog signals DP1 and DQ1, the first and the second baseband amplifiers 67 and 68 are for amplifying the first and the second analog signals DP1 and DQ1 to deliver first and second amplified signals to the first and the second analog-to-digital converters 69 and 70. Each of the first and the second analog-to-digital converters 69 and 70 has seven reference levels 0, ±L, ±2L, and ±3L and carries out a multilevel discrimination of a relevant one of the first and the second amplified signals. The first and the second analog-to-digital converters 69 and 70 produce first and second converted digital signals DP11 and DQ11, each of which is given in bit parallel, as first and second discrimination signals. Each of the first and the second converted digital signals DP11 and DQ11 may be an eight-bit signal.

Figure 10:
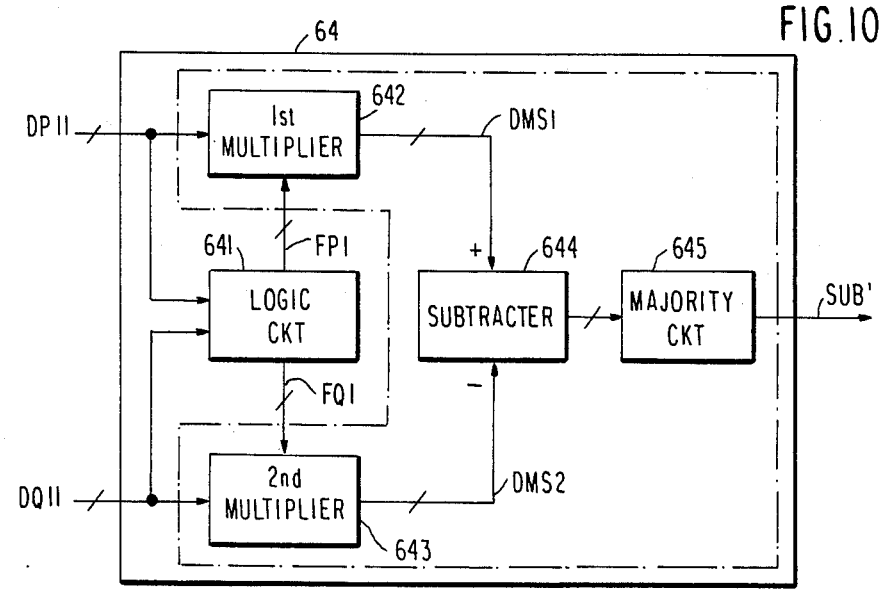
FIG. 10 is a block diagram of a subdata reproducing unit operable as a part of the multilevel demodulator illustrated in FIG. 9.
Figures 11, 12, 13:
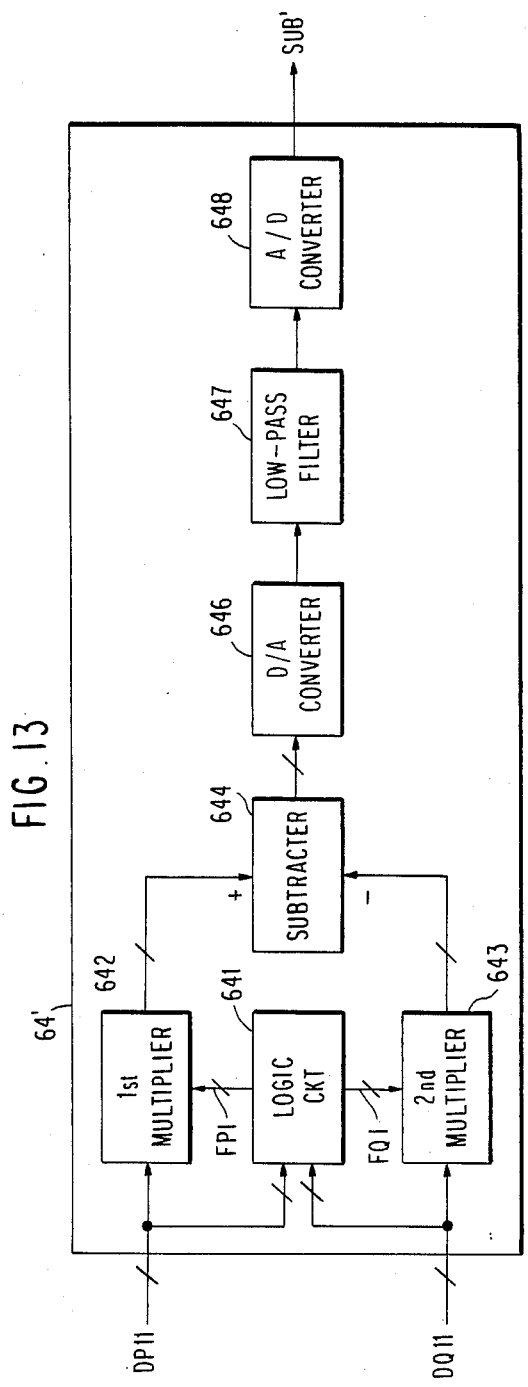
FIG. 11 is a view for use in describing operation of the subdata reproducing unit illustrated in FIG. 10.
FIG. 12 is a view for use in describing operation of the subdata reproducing unit illustrated in FIG. 10.
FIG. 13 is a block diagram of another subdata reproducing unit operable as a part of the multilevel demodulator illustrated in FIG. 9.

Referring afresh to FIGS. 10, 11, and 12, the subdata reproducing unit 64 will be hereinunder described in detail. The subdata reproducing unit 64 comprises a logic circuit 641, first and second multipliers 642 and 643, a subtracter 644, and a majority circuit 645. Responsive to first and second upper bits of the first and the second converted digital signals DP11 and DQ11, the logic circuit 641 discriminates positions of the additional signal points Cij corresponding to the first and the second converted digital signals DP11 and DQ11 and produces first and second factor data FP1 and FQ1. As shown in FIG. 11, the first and the second factor data FP1 and FQ1 take absolute values of unity and three in accordance with the position of the additional signal points Cij, in other words, the number of the positive integer j. As shown in FIG. 12, the first and the second factor data FP1 and FQ1 take positive or negative sign in accordance with the positions of the additional signal points Cij, in other words, the number of the positive integer i.

When the additional signal points Cij are present in the first or the third quadrant of the phase plane, the positive integer i is equal to unity or three. The positive integer j is equal to one of unity through four. In this event, the first and the second multipliers 642 and 643 convert the first and the second converted digital signals DP11 and DQ11 corresponding to the output signal points Aij to first and second multiplication signals DMS1 and DMS2, respectively, which correspond to the output signal point A11 (FIG. 2). The first and the second multipliers 642 and 643 also convert the first and the second converted digital signals DP11 and DQ11 corresponding to the output signal points Bij to the first and the second multiplication signals DMS1 and DMS2, respectively, which correspond to the output signal point B11 (FIG. 2).

When the additional signal points Cij are present in the second or the fourth quadrant of the phase plane, the positive integer i is equal to two or four while the positive integer j is equal to one of unity through four. In this event, the first and the second multipliers 642 and 643 convert the first and the second converted digital signals DP11 and DQ11 corresponding to the output signal points Aij to the first and the second multiplication signals DMS1 and DMS2, respectively, which correspond to the output signal point A31. The first and the second multipliers 642 and 643 also convert the first and the second converted digital signals DP11 and DQ11 corresponding to the output signal point Bij to the first and the second multiplication signals DMS1 and DMS2, respectively, which correspond to the output signal point B31.

Supplied with the first and the second multiplication signals, the subtracter 644 subtracts the second multiplication signal DMS2 from the first multiplication signal DMS1 and produces a subtraction result signal in bit parallel. The subtraction result signal represents a level of the reproduced subdata signal SUB'. Furthermore, the subtraction result signal has the most significant bit representative of a positive sign by the binary "1" when the first and the second converted digital signals DP11 and DQ11 correspond to the output signal point Aij. On the other hand, the subtraction result signal has the most significant bit representative of a negative sign by the binary "0" when the first and the second converted digital signals DP11 and DQ11 correspond to the output signal point Bij. Therefore, it is possible to discriminate whether the output signal points are Aij or Bij by discriminating the sign of the most significant bit of the subtraction result signal. The majority circuit 645 carries out a majority decision on the most significant bit of the subtraction result signal by counting the binary "1" and "0" of the most significant bits, m in number. The majority circuit 645 produces an output signal in which a result of the majority decision lasts m bits.

The output signal is the reproduced subdata signal SUB'.

Referring to FIG. 13, a subdata reproducing unit 64' is similar to that illustrated in FIG. 10 except that a combination of a digital-to-analog converter 646, a low-pass filter 647, and an analog-to-digital converter 648 is substituted for the majority circuit 645 (FIG. 10). Supplied with the subtraction result signal in bit parallel from the subtracter 644, the digital-to-analog converter 646 converts the subtraction result signal to an analog signal. The analog signal has a bandwidth restricted by the low-pass filter 647 which has the same bandwidth as the low-pass filter 59 described in conjunction with FIG. 6. The low-pass filter 647 delivers a filtered signal to the analog-to-digital converter 648. The filtered signal is converted by the analog-to-digital converter 648 to the reproduced subdata signal SUB' of a single bit.

Figures 14, 15:
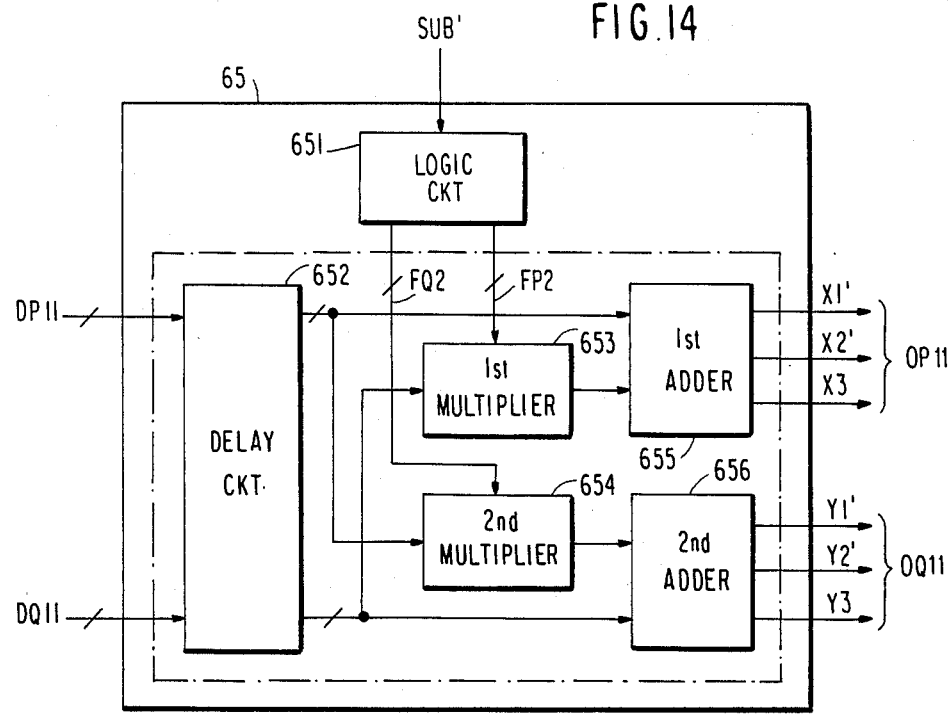
FIG. 14 is a block diagram of a main data reproducing unit operable as a part of the multilevel demodulator illustrated in FIG. 9.
FIG. 15 is a view for use in describing operation of the main data reproducing unit illustrated in FIG. 14.

Referring to FIGS. 14 and 15, the main data reproducing unit 65 comprises a logic circuit 651, a delay circuit 652, first and second multipliers 653 and 654, and first and second adders 655 and 656. The logic circuit 651 produces first and second factor data FP2 and FQ2 in response to the reproduced subdata signal SUB'. As shown in FIG. 15, when the reproduced subdata signal SUB' corresponds to the output signal points Aij (FIG. 2), the logic circuit 651 produces the first factor datum FP2 of $-\tan\alpha$ and the second factor datum FQ2 of $\tan\alpha$. To the contrary, when the reproduced subdata signal SUB' corresponds to the output signal points Bij (FIG. 2), the logic circuit 651 produces the first factor datum FP2 of $\tan\alpha$ and the second factor datum FQ2 of $-\tan\alpha$.

The delay circuit 652 has the same delay time duration as the delay circuit 431 described in conjunction with FIG. 5. A combination of the first and the second multipliers 653 and 654 and the first and the second adders 655 and 656 is a digital calculator and carries out the following digital calculation:

$$\begin{bmatrix} OP11 \\ OQ11 \end{bmatrix} = \begin{bmatrix} 1 & \mp\tan\alpha \\ \pm\tan\alpha & 1 \end{bmatrix} \begin{bmatrix} DP11 \\ DQ11 \end{bmatrix}$$

$$= \frac{1}{\cos\alpha} \begin{bmatrix} \cos\alpha & \mp\sin\alpha \\ \pm\sin\alpha & \cos\alpha \end{bmatrix} \begin{bmatrix} DP11 \\ DQ11 \end{bmatrix},$$

where OP11 and OQ11 are addition results of the first and the second adders 655 and 656, respectively. In the matrix given above, a pair of plus and minus signs will be called a sign pair. When the reproduced subdata signal SUB' corresponds to the output signal point Aij (FIG. 2), an upper sign of the sign pair is used. When the reproduced subdata signal SUB' corresponds to the output signal point Bij (FIG. 2), a lower sign of the sign pair is used.

Referring back to FIG. 2, each of the output signal point Aij or Bij may be considered as a vector (DP11, DQ11). Neglecting a factor $1/\cos\alpha$ which is a constant, the above digital calculation rotates the output signal point Aij by $\alpha$ radian around the origin 0 counterclockwise and rotates the output signal point Bij by $\alpha$ radian around the origin 0 clockwise. Therefore, the first and the second addition results OP11 and OQ11 correspond to the additional signal points Cij (FIG. 2) no matter whichever of the output signal points Aij and Bij the first and the second converted digital signals DP11 and DQ11 may correspond to. Namely, each of the first and the second addition results OP11 and OQ11 is a signal wherein each of the first and the second converted digital signals DP11 and DQ11 is derived of the phase modulated component modulated by the subdata signal.

Referring again to FIG. 9, the first and the second adders 655 and 656 produce the first addition result OP11 represented by first through third bits X1', X2', and X3 and the second addition result OQ11 represented by first through third bits Y1', Y2', and Y3, respectively.

The third bits X3 and Y3 represent a phase deviation of the first and the second amplified signals, namely, first and second input signals of the first and the second analog-to-digital converters 69 and 70 and are delivered to the first and the second baseband amplifiers 67 and 68 through a low-pass filter 71. The first and the second baseband amplifiers 67 and 68 control a d.c. output level thereof in response to the third bits X3 and Y3 filtered by the low-pass filter 71. As a result, it is possible to compensate for a drift of the direct output levels of the first and the second amplified signals. Such a drift compensation of the demodulator is described in U.S. Pat. No. 4,498,050 issued to Yasuharu Yoshida, the instant applicant, and assigned to NEC Corporation.

A first logic circuit 72 is for controlling a gain of the intermediate-frequency amplifier 61 and another gain of the second baseband amplifier 68 in response to the first and the third bits X1 and Y1, and X3 and Y3 of the first and the second addition results OP11 and OQ11. Such a logic circuit is described in U.S. Pat. No. 4,574,246 issued to Yasuharu Yoshida, the instant applicant, and assigned to NEC Corporation.

A second logic circuit 73 controls the voltage controlled oscillator 66 in the manner described in conjunction with FIG. 4.

In FIG. 9, it is possible to reduce a characteristic degradation due to imperfectness of hardware of the demodulator. This is because the main and the subdata signals are reproduced by the digital calculation. Furthermore, an LSI circuit may be used as the digital calculating circuit. In this event, the multilevel demodulator becomes compact.

While this invention has thus far been described in conjunction with several preferred embodiments thereof, it will readily be possible for those skilled in the art to put this invention into practice in various other manners. For example, the first and the second main data signals may be represented by different numbers of bits. In this event, the sum of the different numbers may not necessarily be an even number but an odd number. Furthermore, the number of bits of the first or the second main data signal may be equal to or greater than three. Accordingly, the number of the output signal points of the composite modulated signal may be 32, 64, or so. In this event, it is readily understood that the analog-to-digital converters and the logic circuits should be for an increased number of bits, and that the phase difference $\alpha$ and the positive integer m should be modified for optimum operation.

What is claimed is:

1. A multilevel modulator for modulating a first and a second main data signal and a subdata signal into a composite modulated signal, each of said first and said second main data signals being represented by first through n-th bits where n is a positive integer which is not less than two, said subdata signal being represented by one of a first and a second binary value at a time, wherein the improvement comprises:

modulating means responsive to said first and said second main data signals and said subdata signal for modulating said first and said second main data signals and said subdata signal into said composite modulated signal comprising a quadrature amplitude modulated component and a phase modulated component, said quadrature amplitude modulated component being modulated by said first and said second main data signals and having $2^{2n}$ output signal points on a phase plane, said phase modulated component being modulated by said subdata signal.

2. A multilevel modulator as claimed in claim 1, wherein said modulating means comprises:

phase modulating means responsive to a pair of quadrature-phase carrier signals and said subdata signal for phase modulating said pair of quadrature-phase carrier signals by said subdata signal into said phase modulated component; and quadrature amplitude modulating means responsive to said first and said second main data signals and said phase modulated component for amplitude modulating said phase modulated component by said first and said second main data signals into said composite modulated signal.

3. A multilevel modulator as claimed in claim 2, wherein said phase modulated component has a first phase difference of plus $\alpha$ radian relative to said pair of quadrature-phase carrier signals where $\alpha$ is not greater than $\pi/2^{2n}$ when said subdata signal has said first binary value, said phase modulated component having a second phase difference of minus $\alpha$ radian relative to said pair of quadrature-phase carrier signals when said subdata signal has said second binary value.

4. A multilevel modulator as claimed in claim 1, wherein said modulating means comprises:

converting means responsive to said first and said second main data signals and said subdata signals for converting said first and said second main data signals by said subdata signal into a first and a second converted signal; and quadrature amplitude modulating means responsive to a pair of quadrature-phase carrier signals and said first and said second converted signals for amplitude modulating said pair of quadrature-phase carrier signals by said first and said second converted signals into said composite modulated signal.

5. A multilevel modulator for modulating a main data signal and a subdata signal into a composite modulated signal, said main data signal being represented by first through N-th bits where N is an odd number, said subdata signal being represented by one of a first and a second binary value at a time, wherein the improvement comprises:

modulating means responsive to said main data signal and said subdata signal for modulating said main data signal and said subdata signal into said composite modulated signal comprising a quadrature amplitude modulated component and a phase modulated component, said quadrature amplitude modulated component being modulated by said main data signal and having $2^N$ signal points on a phase plane, said phase modulated component being modulated by said subdata signal.

6. A multilevel demodulator for demodulating a composite modulated signal comprising a multilevel quadrature amplitude modulated component modulated by a first and a second main data signal and a phase modulated component modulated by a subdata signal, each of said first and said second main data signals being represented by first through n-th bits and having a first bit rate $f_1$ where n represents a positive integer which is not less than two, said subdata signal being represented by one of a first and a second binary value at a time and having a second bit rate $f_2$ which is not greater than said first bit rate divided by a predetermined natural number m, said phase modulated component having a first phase difference of plus $\alpha$ radian when said subdata signal is represented by said first binary value, where $\alpha$ is not greater than said phase modulated component having a second phase difference of minus $\alpha$ ( radian when said subdata signal is represented by said second binary value, said demodulator comprising detecting means for phase detecting said composite modulated signal to produce a first and a second phase detection signal, wherein the improvement comprises:

reproducing means coupled to said detecting means for reproducing a reproduced subdata signal and a first and a second reproduced main data signal in response to said first and said second phase detection signals.

7. A multilevel demodulator as claimed in claim 6, wherein said reproducing means comprises:

subdata reproducing means responsive to said first and said second phase detection signals for reproducing said reproduced subdata signal; and main data reproducing means responsive to said first and said second phase detection signal for reproducing said first and said second reproduced main data signals in accordance with said reproduced subdata signal.

8. A multilevel demodulator as claimed in claim 7, wherein said subdata reproducing means comprises:

analog-to-digital converting means responsive to said first and said second phase detection signals for converting said first and said second phase detection signals to a first and a second digital signal; and subdata producing means responsive to said first and said second digital signals for producing said reproduced subdata signal.

9. A multilevel demodulator as claimed in claim 8, wherein said subdata producing means comprises:

logic circuit means responsive to said first and said second digital signals for carrying out a logical operation on said first and said second digital signals to produce a first and a second logical output signal; and majority circuit means responsive to said first and said second logical output signals for carrying out a majority decision on 2m-bits which are equal to a sum of m-bits of said first logical output signal and m-bits of said second logical output signal to produce a result signal as said reproduced subdata signal.

10. A multilevel demodulator as claimed in claim 7, wherein said main data reproducing means comprises:

processing means coupled to said detecting means for processing said first phase detection signal to a first and a second processed digital signal and said second phase detection signal to a third and a fourth processed digital signal; and selecting means coupled to said processing means for selecting one of said first and said second processed digital signals and one of said third and said fourth processed digital signals in accordance with said predetermined one of the binary values of said reproduced subdata signal.

11. A multilevel demodulator as claimed in claim 10, wherein said processing means comprises:
   phase shifting means responsive to said first and said second phase detection signals for shifting a phase of said first phase detection signal to produce a first and a second phase shifted signal and a phase of said second phase detection signal to produce a third and a fourth phase shifted signal, said first and said second phase shifted signals having a leading and a lagging phase of $\alpha$ radian relative to said first phase detection signal, said third and said fourth phase shifted signals having a leading and a lagging phase of $\alpha$ radian relative to said second phase detection signal;
   analog-to-digital converting means responsive to said first through said fourth phase shifted signals for converting said first through said fourth phase shifted signals to said first through said fourth processed digital signals.

12. A multilevel demodulator as claimed in claim 6, wherein said reproducing means comprises:
   converting means coupled to said detecting means for converting said first and said second phase detection signals to a first and a second converted digital signal;
   subdata reproducing means responsive to said first and said second converted digital signals for reproducing said reproduced subdata signal;
   main data reproducing means responsive to said first and said second converted digital signals for reproducing said first and said second reproduced main data signals in accordance with said reproduced subdata signal.

13. A multilevel demodulator as claimed in claim 12, wherein said subdata reproducing means comprises:
   logic circuit means responsive to said first and said second converted digital signals for carrying out a logical operation on said first and said second converted digital signals to produce a first and a second factor datum; and
   digital processing means responsive to said first and said second converted digital signals and said first and said second factor data for processing said first and said second converted digital signals and said first and said second factor data into said reproduced subdata signal.

14. A multilevel demodulator as claimed in claim 13, wherein said digital processing means comprises:
   a first multiplier responsive to said first converted digital signal and said first factor datum for multiplying said first converted digital signal by said first factor datum to produce a first multiplication signal;
   a second multiplier responsive to said second converted digital signal and said second factor datum for multiplying said second converted digital signal by said second factor datum to produce a second multiplication signal;
   a subtracter responsive to said first and said second multiplication signals for subtracting said first multiplication signal from said second multiplication signal to produce a subtraction result signal; and
   a majority circuit responsive to said subtraction result signal for carrying out a majority decision on a succession of m bits of said subtraction result signal to produce a discrimination signal as said reproduced subdata signal.

15. A multilevel demodulator as claimed in claim 13, wherein said digital processing means comprises:
   a first multiplier responsive to said first converted digital signal and said first factor datum for multiplying said first converted digital signal by said first factor datum to produce a first multiplication signal;
   a second multiplier responsive to said second converted digital signal and said second factor datum for multiplying said second converted digital signal by said second factor datum to produce a second multiplication signal;
   a subtracter responsive to said first and said second multiplication signals for subtracting said first multiplication signal from said second multiplication signal to produce a subtraction result signal;
   a digital-to-analog converter coupled to said subtracter for converting said subtraction result signal to an analog signal;
   a low-pass filter coupled to said digital-to-analog converter for extracting a predetermined band of said analog signal to produce a filtered signal; and
   an analog-to-digital converter coupled to said low-pass filter for converting said filtered signal to a digital signal as said reproduced subdata signal.

16. A multilevel demodulator as claimed in claim 12, wherein said main data reproducing means comprises:
   logic circuit means responsive to said reproduced subdata signal for carrying out a logical operation on said reproduced subdata signal to produce a first and a second factor datum; and
   digital processing means responsive to said first and said second converted digital signals and said first and said second factor data for processing said first and said second converted digital signals and said first and said second factor data into said first and said second reproduced main data signals.

17. A multilevel demodulator as claimed in claim 16, wherein said digital processing means comprises:
   a first multiplier responsive to said first converted digital signal and said first factor datum for multiplying said first converted digital signal by said first factor datum to produce a first multiplication signal;
   a second multiplier responsive to said second converted digital signal and said second factor datum for multiplying said second converted digital signal by said second factor datum to produce a second multiplication signal;
   a first adder responsive to said first converted digital signal and said second multiplication signal for adding said first converted digital signal to said second multiplication signal to produce said first reproduced main data signal; and
   a second adder responsive to said second converted digital signal and said first multiplication signal for adding said second converted digital signal to said first multiplication signal to produce said second reproduced main data signal.

18. A multilevel demodulator for demodulating a composite modulated signal comprising a multilevel quadrature amplitude modulated component modulated by a main data signal and a phase modulated component modulated by a subdata signal, said main data signal being represented by first through N-th bits and having a first bit rate $f_1$ where N represents an odd number, said subdata signal being represented by one of a first and a second binary value at a time and having a second bit rate $f_2$ which is not greater than said first bit rate divided by a predetermined natural number m, said phase modulated component having a first phase difference of plus $\alpha$ radian when said subdata signal is represented by said first binary value, where $\alpha$ is not greater than $\pi/2^N$, said phase modulated component having a second phase difference of minus $\alpha$ radian when said subdata signal is represented by said second binary value, said demodulator comprising detecting means for phase detecting said composite modulated signal to produce a first and a second phase detection signal, wherein the improvement comprises:

reproducing means coupled to said detecting means for reproducing a reproduced subdata signal and a first and a second reproduced main data signal in response to said first and said second phase detection signals.

* * * * *

UNITED STATES PATENT AND TRADEMARK OFFICE
CERTIFICATE OF CORRECTION

PATENT NO. : 4,751,478
DATED : June 14, 1988
INVENTOR(S) : Yoshida

It is certified that error appears in the above-identified patent and that said Letters Patent is hereby corrected as shown below:

Cover Page, Priority Data     Delete "October 14, 1987" and insert January 14, 1987--;

COLUMN 2, LINE 28     Delete "m" and insert --$\underline{m}$--;

COLUMN 3, LINE 46     Delete "m" and insert --$\underline{m}$--;

COLUMN 5, LINE 43     Delete "ma" and insert --may--;

COLUMN 9, LINE 23     Delete "secon" and insert --second--;

COLUMN 15, LINE 63     After "$2^N$" and insert --output--;

COLUMN 16, LINE 13     After "greater than" insert --$\pi/2^{2n}$,--

COLUMN 16, LINE 14     After "minus a" delete "("

Signed and Sealed this

Sixth Day of December, 1988

*Attest:*

DONALD J. QUIGG

*Attesting Officer*     *Commissioner of Patents and Trademarks*